United States Patent
Kuriyama

(10) Patent No.: US 6,556,837 B1
(45) Date of Patent: Apr. 29, 2003

(54) CLOSED-LOOP TRANSMITTING POWER CONTROL METHOD USING VARIABLE UPDATING AMOUNT

(75) Inventor: Takahiro Kuriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/562,163

(22) Filed: May 2, 2000

(30) Foreign Application Priority Data

May 6, 1999 (JP) ............................................. 11-126121

(51) Int. Cl.⁷ ................................................ H04B 7/00
(52) U.S. Cl. ........................ 455/522; 455/69; 455/67.1; 370/342
(58) Field of Search .......................... 455/522, 69, 67.1, 455/88, 73, 68, 13.4; 370/318, 320, 342, 335, 333, 345

(56) References Cited

U.S. PATENT DOCUMENTS

| | | | | |
|---|---|---|---|---|
| 6,034,952 A | * | 3/2000 | Dohi et al. | 370/335 |
| 6,278,701 B1 | * | 8/2001 | Ayyagari et al. | 370/335 |
| 6,311,070 B1 | * | 10/2001 | Tong et al. | 455/522 |
| 6,330,456 B1 | * | 12/2001 | Hashem et al. | 455/522 |
| 6,341,214 B2 | * | 1/2002 | Uesugi | 455/69 |
| 6,373,823 B1 | * | 4/2002 | Chen et al. | 370/252 |

FOREIGN PATENT DOCUMENTS

| | | |
|---|---|---|
| JP | 6-276130 | 9/1994 |
| JP | 8-181653 | 7/1996 |
| JP | 9-135193 | 5/1997 |
| JP | 10-32540 | 2/1998 |

* cited by examiner

Primary Examiner—Quochien Vuong
Assistant Examiner—Sonny Trinh
(74) Attorney, Agent, or Firm—Sughrue Mion, PLLC

(57) ABSTRACT

Closed-loop transmitting power control method is disclosed that employs a variable updating amount. At a receiver, the presence or absence of frame errors in a received signal from a transmitter is determined using CRC coding. If frame errors do not occur, a downward updating amount, which is an updating amount for lowering a reference value, is set according to the magnitude of the reference $Eb/I0$ value, the reference $Eb/I0$ value is lowered by this downward updating amount, and an error incidence flag is turned OFF. If frame errors are detected, an upward updating amount, which is an updating amount for raising the reference value, is set according to the logical state of the error incidence flag, the reference $Eb/I0$ value is raised by the upward updating amount, and the error incidence flag is turned ON.

6 Claims, 6 Drawing Sheets

CLOSED-LOOP TRANSMITTING POWER CONTROL METHOD USING VARIABLE UPDATING AMOUNT

BACKGROUND OF THE INVENTION

1. Field of the Invention

The present invention relates to a closed-loop transmitting power control method in a Code Division Multiple Access communication system that controls the transmitting power of a transmitter such that the Eb/I0 value of the signal from each transmitter at a receiver converges on a particular reference value, and in particular, relates to a method of updating the target reference value during closed-loop transmitting power control.

2. Description of the Related Art

The CDMA communication method has received increasing attention in recent years as a communication method for use in a mobile communication systems that is resistant to interference or disturbances. Unlike communication using the FDMA and TDMA methods, which monopolize the transmission channel in terms of frequency or time, communication using the CDMA method features system efficiency that is not limited by the assigned frequency band. In contrast, system efficiency in the CDMA method is determined by the power-to-interference power ratio of the received signal (hereinbelow referred to as "Eb/I0"). As a result, the power of interference from other channels must be suppressed to the utmost in a mobile communication system that uses the CDMA communication method.

In a communication environment of moving units, differences in propagation loss on transmission lines causes a lack of uniformity in signal level, and raising the system efficiency of a communication realized through by the CDMA method necessitates control of the transmitting power from transmitters such that the received signal level at a receiver is fixed. A closed-loop power control method is one example of a transmitting power control method for achieving this goal. In the closed-loop power control method, the power-to-interference power ratio of the signal received by a receiver is first compared with a target reference value. A signal requesting that the transmitting power be raised if the received signal power-to-interference power ratio is lower than the reference value or that the transmitting power be lowered if the received signal power-to-interference power ratio is greater than the reference value is then inserted in the transmitted signal of that station. The partner station that receives this signal then controls the transmitting power in accordance with the request contained in the signal. If the reference value that is used for comparison is set to a high value in this method, the transmitting power is forced to a high value, giving rise to unnecessary interference between channels. In the interest of raising system efficiency, therefore, the transmitting power must be lowered by setting the reference value to the minimum necessary value within the range that satisfies the requested communication quality.

In an environment of moving units, attenuation due to the length of transmission lines as well as attenuation due to fading fluctuation that accompanies the travel of a mobile station cause the instantaneous received signal level to change with relative rapidity. As a result, the reference value in closed-loop transmitting power control is not a fixed value and must be updated to a value that can prevent degradation in communication quality.

Since a high reference values exert a greater influence on other channels, the reference value is preferably updated so as to converge as rapidly as possibly on the minimum value necessary to satisfy the requested quality. Poor response in updating reference values can cause the problem of degradation in communication quality and breaks in communication. On the other hand, setting the amount of updating too high to guarantee response can lead to extreme degradation of communication quality due to updating of the reference value. In the prior-art method of closed-loop transmitting power control, the amount of updating of the reference value was fixed to a fixed value, with the result that the updating response could not be increased without causing severe degradation of communication quality.

SUMMARY OF THE INVENTION

It is an object of the present invention to provide a closed-loop transmitting power control method that can cause the reference value to quickly converge on an optimum value without severely degrading communication quality.

To achieve the above-described object in the closed-loop transmitting power control method of the present invention, a measurement of frame errors during a fixed time interval in the received signal from a transmitter is first carried out at a receiver. If a frame error is not detected in this measurement, a downward updating amount, which is an amount of updating for lowering the reference value, is set according to the magnitude of the reference value, the reference value is lowered by the downward updating amount, and further, an error incidence flag is turned OFF. If a frame error is detected in the frame error measurement, an upward updating amount, which is an amount of updating for raising the reference value, is set according to the logical state of the error incidence flag, the reference value is raised by the upward updating amount, and in addition, the error incidence flag is turned ON.

When lowering the reference value, the present invention determines the amount of downward updating based on the magnitude of the reference value, and can therefore prevent sudden changes in communication quality by making the downward updating amount a small value when the reference amount is small, and can cause the reference value to rapidly converge on the optimum value by making the downward updating amount a large value when the reference value is large. When raising the reference value, the present invention determines the amount of upward updating according to the logical state of the error incidence flag, and thus infers that the received signal level is fluctuating and that communication quality is changing sharply when frame errors occur continuously, whereby the present method can make the upward updating amount a large value to cause the reference value to rapidly converge on the optimum value and thereby suppress degradation in communication quality.

According to another closed-loop transmitting power control method of the present invention, frame errors during a fixed time interval in received signals from a transmitter are first measured at a receiver. If no frame errors are detected in this measurement, the amount of downward updating, which is an amount of updating for lowering the reference value, is set according to the magnitude of the reference value, the reference value is lowered by this downward updating amount, and in addition, the fluctuation level, which is a value indicating the degree of stability of the communication environment, is reduced by "1" unless the fluctuation level is "0." If frame errors are detected in the frame error measurement, however, the amount of upward updating, which is an amount of updating for raising the reference value, is set according to the value of the fluctuation level, the reference value is raised by the upward updating amount, and the fluctuation level value is increased by "1."

By determining the downward updating amount based on the magnitude of the reference value when lowering the reference value, the present invention can prevents abrupt changes in communication quality by making the amount of downward updating a small value when the reference value is small, and can cause the reference value to rapidly converge on the optimum value by making the downward updating amount a large value when the reference value is large. Moreover, since the amount of upward updating is determined according to the value of the fluctuation level when raising the reference value, the present invention can infer that the received signal level is fluctuating and that communication quality is changing sharply when frame errors occur continuously, and thus can make the upward updating amount a large level to cause the reference value to rapidly converge on the optimum value, thereby suppressing degradation of the communication quality.

The above and other objects, features, and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
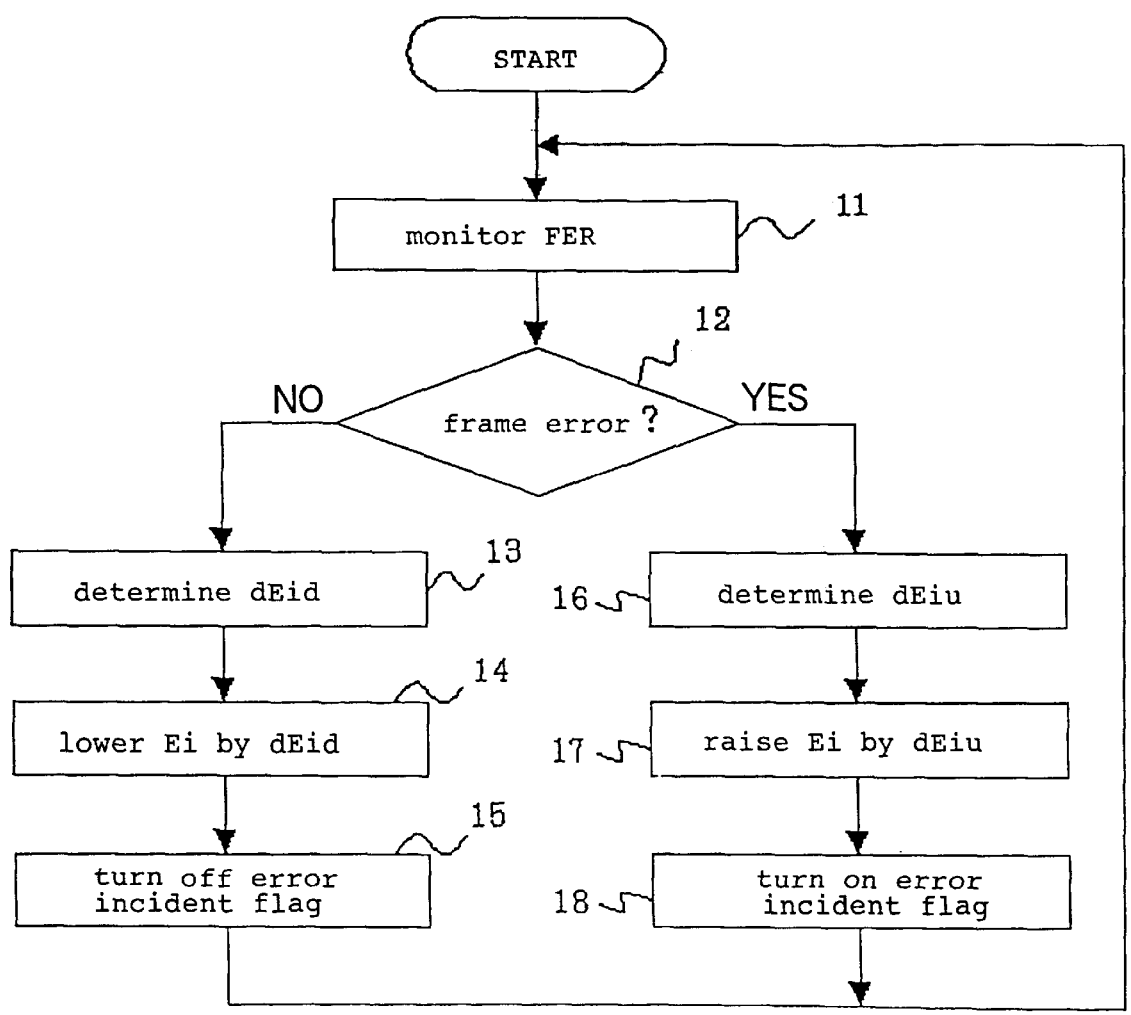
FIG. 1 is a flow chart showing the overall algorithm for updating the Eb/I0 value that serves as the reference value in the closed-loop transmitting power control method according to the first embodiment of the present invention.
Figure 2:
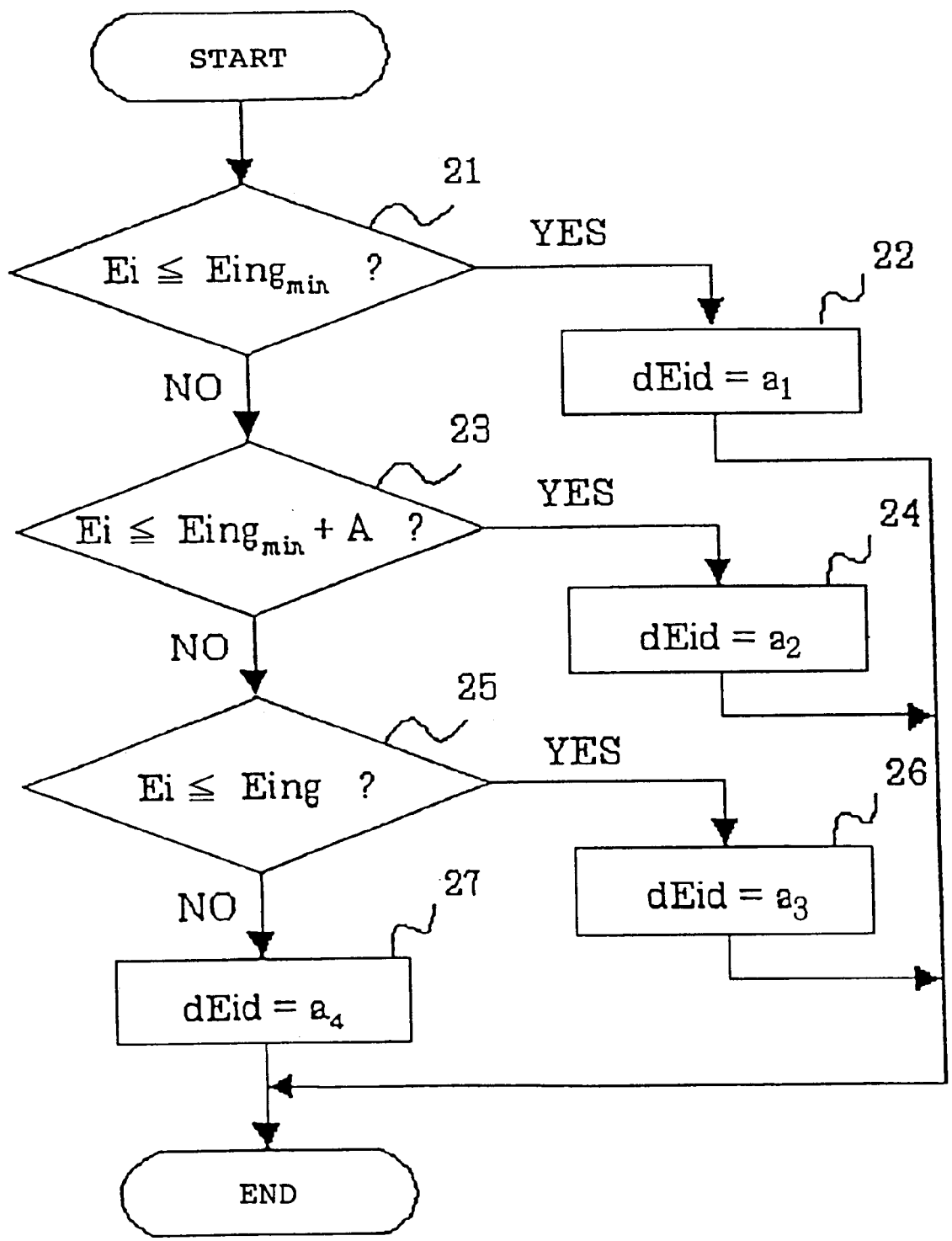
FIG. 2 is a flow chart showing the method of Step 13 in FIG. 1 for determining a downward updating amount dEid.
Figure 3:
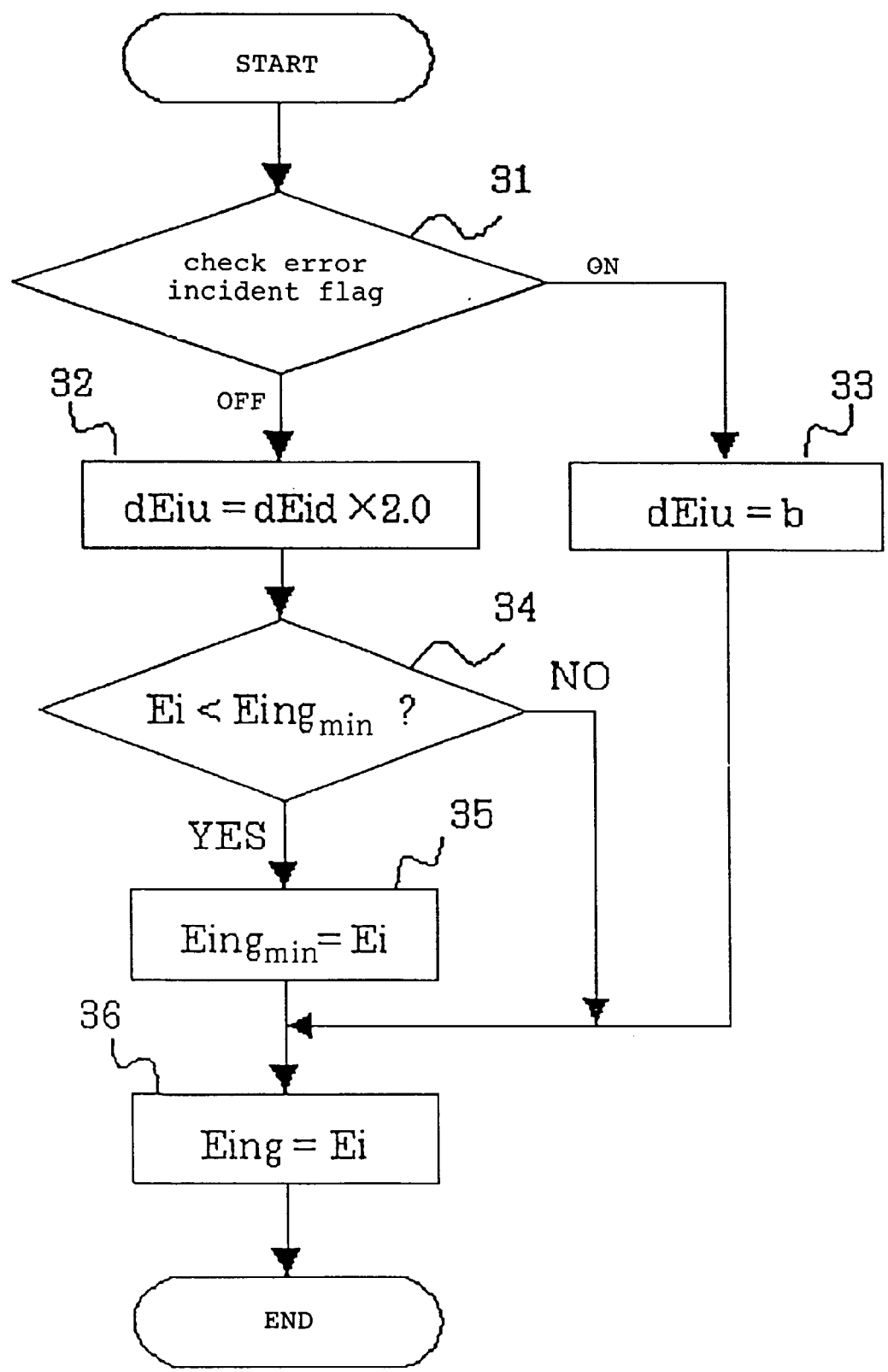
FIG. 3 is a flow chart showing the method of Step 16 in FIG. 1 for determining an upward updating amount dEiu.

Referring now to the flow charts of FIGS. 1, 2, and 3, a detailed explanation is presented regarding the overall operation of the closed-loop transmitting power control method according to the first embodiment of the present invention.

Explanation is first presented regarding the overall operation of the method of this embodiment while referring to FIG. 1. In Step 11, FER (Frame Error Rate) monitoring for a fixed time interval t is performed at a receiver by means of CRC (Cyclic Redundancy Check) code detection, and the occurrence or non-occurrence of frame errors is judged in Step 12. A frame error is determined to have occurred if a single NG is detected by CRC code detection in Step 12. If it is determined that a frame error did not occur in Step 12, a downward updating amount dEid, which is an updating amount for lowering the reference value, is determined in Step 13, and processing is carried out in Step 14 to lower the reference Eb/I0 value (Ei) by the downward updating amount dEid. An error incidence flag is then turned OFF in Step 15, and the process returns to the fixed time interval FER monitoring of Step 11. The error incidence flag is a flag for detecting continued occurrence of errors.

If an error is detected in Step 12, an upward updating amount dEiu, which is an updating amount for raising the reference value, is determined in Step 16, and the process of raising the reference Eb/I0 value by upward updating amount dEiu is performed in Step 17. The error incidence flag is then turned ON in Step 18, whereupon the process returns to the fixed time interval FER monitoring of Step 11.

FIG. 2 is a flow chart showing details of the process of Step 13 in which the downward updating amount dEid is determined when no error occurs in the fixed time interval FER monitoring of Step 11 in FIG. 1.

In Step 21, it is first determined whether or not the reference Eb/I0 value (Ei) is less than or equal to the minimum Eb/I0 value at which errors occurred ($Eing_{min}$ being the "minimum Eb/I0 value of error incidence"). If the conditional equation is satisfied in Step 21, it is then assumed that the reference Eb/I0 value falls below the minimum Eb/I0 value of error incidence ($Eing_{min}$) and that updating the reference Eb/I0 value may bring about errors; i.e., degradation in communication quality. As a result, set value $a_1$, which is a minute amount, is set as the downward updating amount dEid in Step 22.

It is next determined in Step 23 whether or not the reference Eb/I0 value (Ei) is equal to or less than the sum of the minimum Eb/I0 value of error incidence and an update warning threshold value A. If the conditional equation is satisfied in Step 23, the difference between the reference Eb/I0 value and the minimum Eb/I0 value of error incidence is within update warning threshold value A, and the downward updating amount dEid is set to the extremely small set amount $a_2$ in Step 24 for the same reasons as when the conditional equation is satisfied in Step 21.

It is next determined in Step 25 whether or not reference Eb/I0 value (Ei) is equal to or less than the Eb/I0 value at which errors previously occurred (Eing being the "Eb/I0 value of error incidence"). If the conditional equation is satisfied in Step 25, the reference Eb/I0 value is lower than the Eb/I0 value at which the preceding error occurred (Eing), and when there are few changes from the communication environment of the previous determination, it can be inferred that the communication quality will deteriorate and that errors will occur as before. As a result, set value $a_3$ is set in Step 26 to avoid large updating of the reference Eb/I0 value. When the conditional equation is not satisfied in Step 25, there is little possibility that errors will occur due to updating of the reference Eb/I0 value, and set value $a_4$, which is a comparatively large updating amount, is therefore set in Step 27. The relation between each of the set values is: $a_1 < a_2 < a_3 < a_4$.

FIG. 3 is a flow chart showing the method of Step 16 for determining upward updating amount dEiu when an error is detected in the FER monitoring of a fixed time interval of Step 11. The logical state of the error incidence flag is first determined in Step 31. If it is determined in Step 31 that the error incidence flag is OFF, the reference Eb/I0 value is lowered (Steps 13–15) because errors did not occur in the previous monitoring, and it can be inferred that errors have occurred due to the lowering of the reference value. In this case, therefore, it can be supposed that, as long as there have been no changes in the communication environment, errors will stop occurring if the reference value is returned to its original value. Thus, to more securely prevent degradation in communication quality, a value that is twice the downward updating amount dEid is set as the upward updating amount dEiu in Step 32. The determination in Step 31 that the error incidence flag is ON indicates that an error also occurred at the time of previous monitoring, that the reference Eb/I0 value has been raised (Step 16–18), and that errors have continued to be detected. As already described, it can be assumed when errors continue to occur that the received signal level is changing due to worsening of the communication environment, and set value b, which is a relatively large updating amount, is therefore set in Step 33 to prevent degradation in communication quality. In this case, set value b is a value that satisfies the relation:

2×set value $a_4$<b.

In Steps 34, 35, and 36, the minimum value of Eb/I0 of error incidence and the value Eb/I0 of error incidence are updated.

When the communication environment has attained relative stability and there are few changes in the received signal level, the reference Eb/I0 value can be assumed to converge on the vicinity of the minimum Eb/I0 value of error incidence. In other words, when the conditional equation in Step 23 is not satisfied, the received signal level is changing due to deterioration of the communication environment, and when the communication environment recovers and conditions are again good, the reference Eb/I0 value can be assumed to converge on the vicinity of the minimum Eb/I0 value of error incidence.

Figure 4:
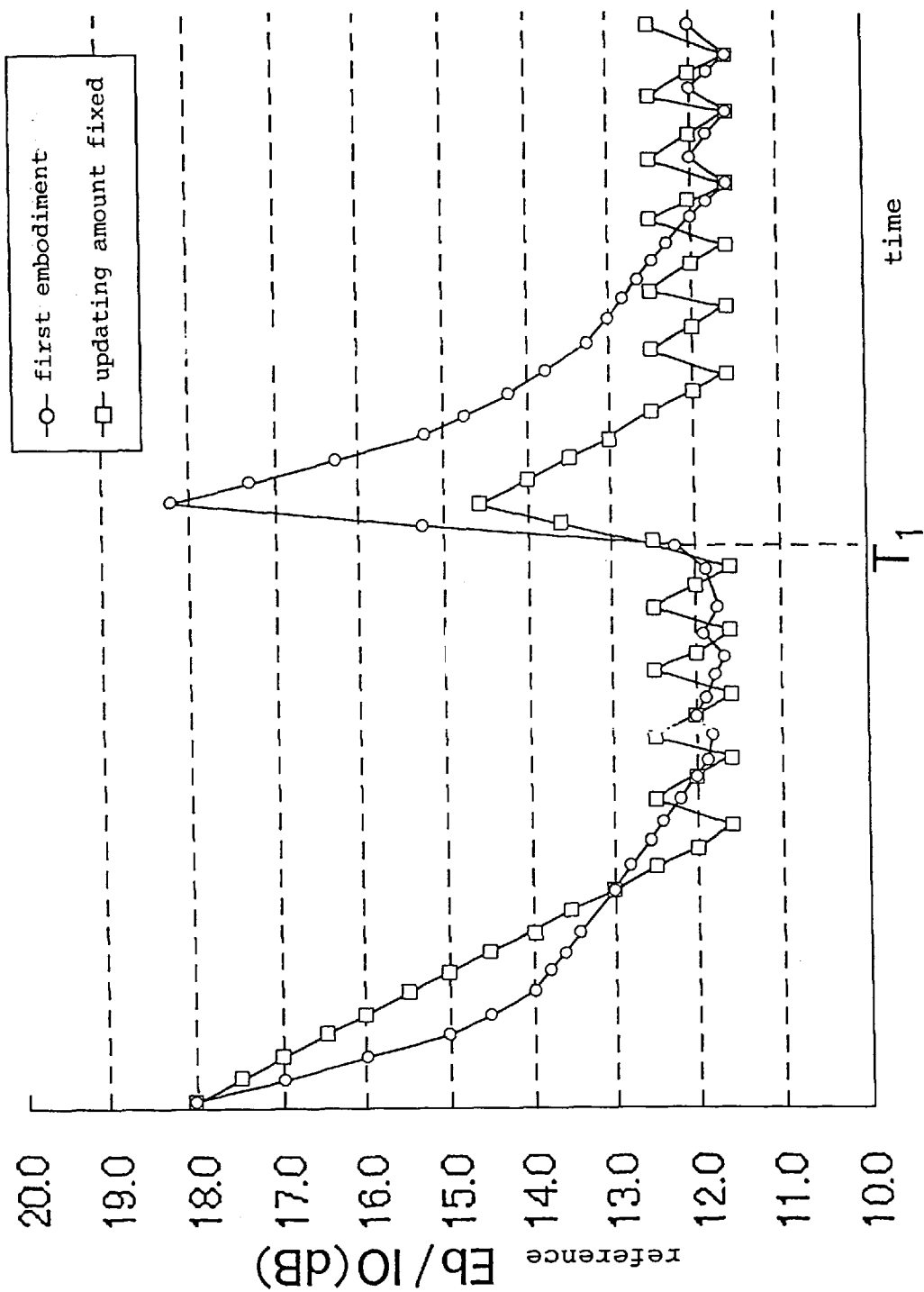
FIG. 4 shows an example of change in the reference Eb/I0 value according to the first embodiment of the closed-loop transmitting power control method of the present invention.

FIG. 4 shows an example of change in the reference Eb/I0 value for a case in which $a_1$ is 0.1 dB, $a_2$ is 0.2 dB, $a_3$ is 0.5 dB, $a_4$ is 1.0 dB, b is 3.0 dB, A is 2.0 dB, and t is 3 seconds. As for the initial values of the reference Eb/I0 value, the Eb/I0 value of error incidence, and the minimum Eb/I0 value of error incidence, Ei is set to 18.0 dB, Eing is set to 15.0 dB, and $Eing_{min}$ is set to 12.0 dB. FIG. 4 also shows the results achieved by the prior-art method for a case in which the downward updating amount is fixed at 0.5 dB and the upward updating amount is fixed at 1.0 dB. In FIG. 4, the communication environment deteriorates and the received signal level drastically changes at time $T_1$.

Referring to FIG. 4, it can be seen that in the closed-loop transmitting power control method of this embodiment, the amount of updating increases and the reference Eb/I0 value quickly becomes a high value when the communication environment deteriorates, and then quickly converges on the original value when the communication environment returns to normal.

In the closed-loop transmitting power control method of this embodiment, the amount of updating is determined while taking into consideration the effect upon communication quality brought about by updating the reference value by comparing the reference value with the Eb/I0 value of error incidence, the minimum Eb/I0 value of error incidence, and the update warning threshold value. This method thus enables reference value updating that converges in a relatively short time interval without causing sudden changes in communication quality.

Furthermore, the closed-loop transmitting power control method of this embodiment detects the continued incidence of errors by using an error incidence flag and sets a relatively large updating amount when errors continue to occur. This method therefore enables reference value updating that prevents degradation of communication quality when the received signal level changes due to deterioration of the communication environment.

Second Embodiment

The closed-loop transmitting power control method according to the second embodiment of the present invention is next described with reference to FIG. 5.

This embodiment differs from the first embodiment shown in FIG. 1 in that a parameter referred to as fluctuation level L is provided in place of the error incidence flag. Fluctuation level L is an integer parameter greater than or equal to 0 that becomes 0 when the communication environment is stable and becomes 1, 2, 3, or more during instability.

Steps 51, 52, 53, 54, 56, and 57 in this embodiment have the same processing content as Steps 11, 12, 13, 14, 16, and 17 shown in FIG. 1, and redundant explanation is therefore omitted.

Figure 5:
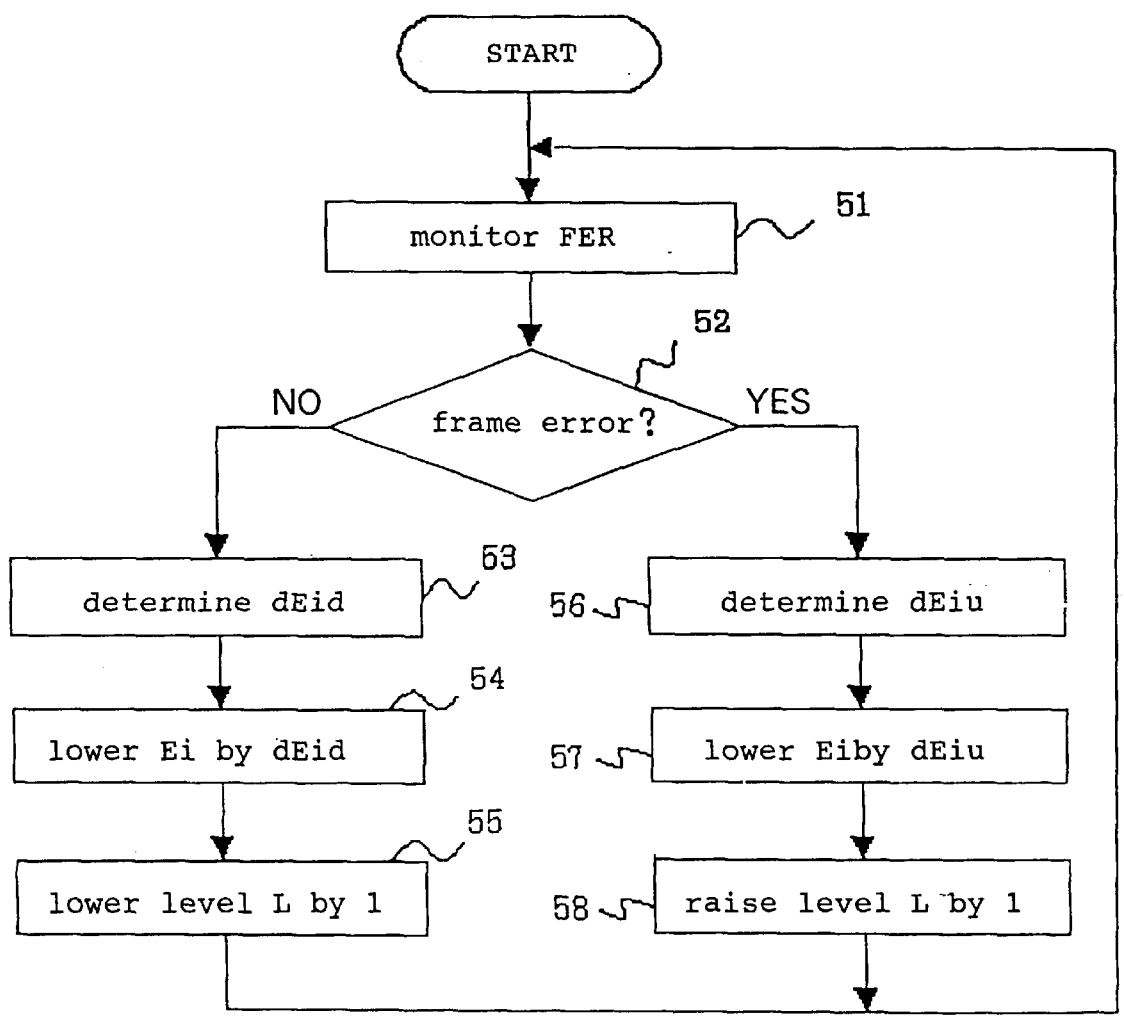
FIG. 5 is a flow chart showing the overall algorithm for updating the of Eb/I0 value that serves as the reference value in the closed-loop transmitting power control method according to the second embodiment of the present invention.

Referring now to FIG. 5, in the closed-loop transmitting power control method according to this embodiment, a fixed time interval FER monitoring process is first carried out in Step 51. If it is judged in Step 52 that an error has not occurred, a downward updating amount dEid is determined in Step 53, and processing is carried out in Step 54 to lower reference value Ei by the downward updating amount dEid. Processing up to this point is identical to that of the first embodiment. In Step 55, a process is carried out to lower fluctuation level L by 1, unless fluctuation level L is 0, in which case it is left unchanged. When no error occurs in the fixed time interval FER monitoring of Step 51, the method of determining the downward updating amount dEid is entirely the same as the method shown in FIG. 2.

If the occurrence of an error is detected in Step 52, the upward updating amount dEiu is determined in Step 56, and processing is carried out in Step 57 to raise reference value Ei by the upward updating amount dEiu. Processing is then carried out in Step 58 to increase fluctuation level L by 1.

Figure 6:
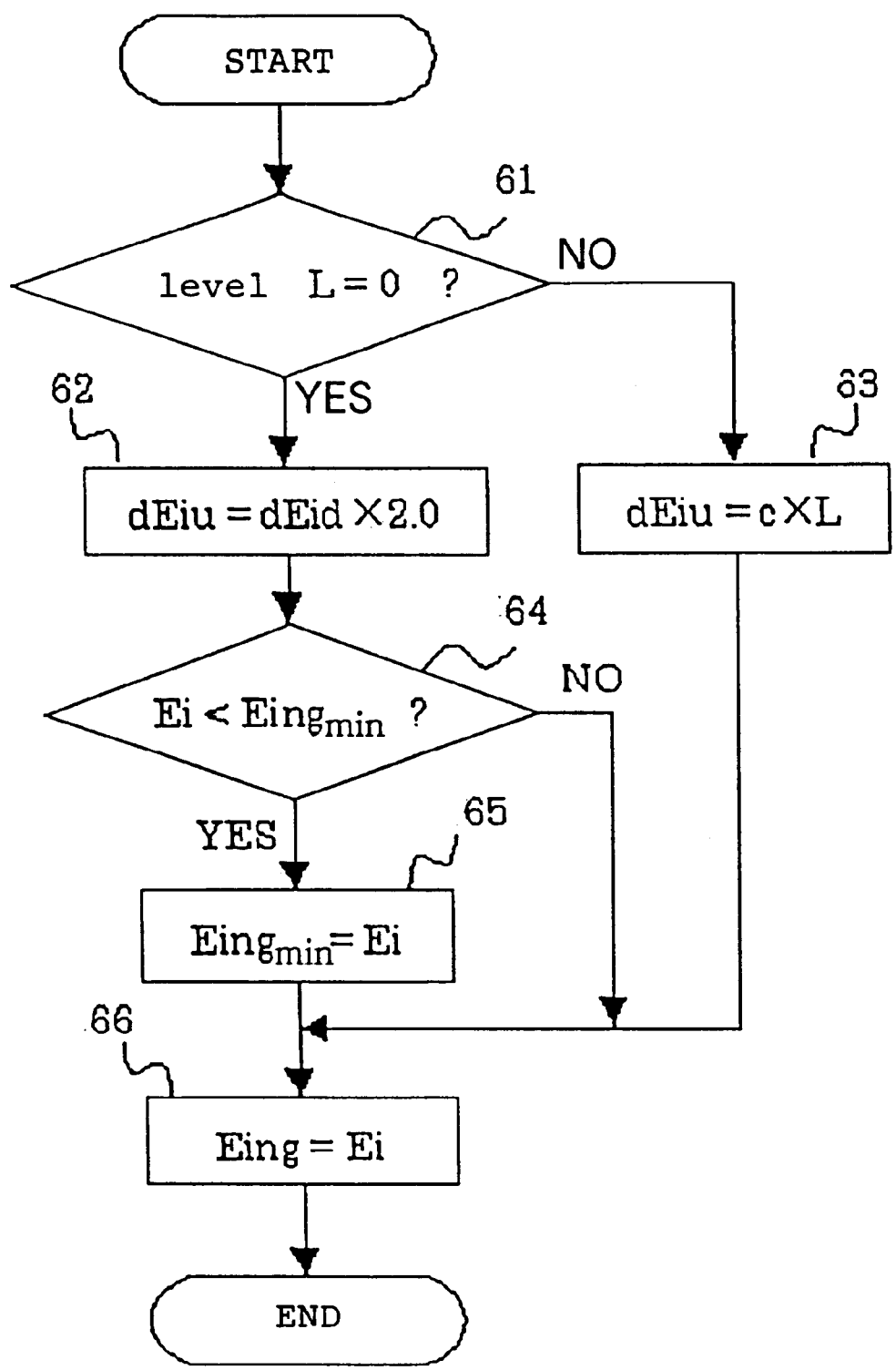
FIG. 6 is a flow chart showing the method of Step 56 in FIG. 5 for determining an upward updating amount dEiu.

FIG. 6 is a flow chart showing the method of Step 56 for determining the upward updating amount dEiu when an error is detected in the fixed time interval FER monitoring of Step 51. First, it is determined in Step 61 whether or not fluctuation level L is 0. The processing of Steps 62, 64, 65, and 66 that is carried out when the fluctuation level L is determined to be 0 in Step 61 is identical to the processing performed in Steps 32, 34, 35, and 36 shown in FIG. 3. Determination that fluctuation level L is a value other than 0 in Step 61 indicates that continuous errors have been detected. In such a case, it is assumed that the communication environment is changing and that the received signal level is fluctuating, and a value is therefore set in Step 63 that is obtained by multiplying fluctuation level L by a particular set value c to prevent degradation in communication quality. As an actual example, a value on the order of 2 dB is set as set value c.

Through the process of setting fluctuation level L, this embodiment has the additional effect of providing more appropriate response to rapid fluctuations in the communication environment, thereby realizing updating of the reference value that prevents degradation of communication quality.

While-preferred embodiments of the present invention have been described using specific terms, such description is for illustrative purposes only, and it is to be understood that changes and variations may be made without departing from the spirit or scope of the following claims.

What is claimed is:

1. A closed-loop transmitting power control method in which a receiver instructs a transmitter to increase or decrease transmitting power such that an Eb/I0 value of signals received by said receiver from said transmitter converges on a set reference value, said method comprising the steps of:

performing a measurement at said receiver of frame errors during a fixed time interval of received signals from said transmitter;

if a frame error is not detected in said measurement, setting a downward updating amount, which is an updating amount for lowering said reference value, in accordance with the magnitude of said reference value, lowering said reference value by said downward updating amount, and further, turning OFF an error incidence flag; and if a frame error is detected in said measurement, setting an upward updating amount, which is an updating amount for raising said reference value, in accordance with the logical state of said error incidence flag, raising said reference value by the upward updating amount, and further, turning ON said error incidence flag.

2. A method according to claim 1, wherein the step of setting said downward updating amount according to the magnitude of said reference value comprises the steps of:

setting a first value as said downward updating amount when said reference value is less than or equal to a minimum Eb/I0 value of error incidence, which is the minimum Eb/I0 value at which frame errors occur;

setting a second value that is greater than said first value as said downward updating amount when said reference value is greater than said minimum Eb/I0 value of error incidence and less than or equal to the sum of said minimum Eb/I0 value of error incidence and an update warning threshold value, which is a predetermined fixed value;

setting a third value that is greater than said second value as said downward updating amount when said reference value is greater than the sum of said minimum Eb/I0 value of error incidence and said update warning threshold value and less than or equal to a Eb/I0 value of error incidence, which is the Eb/I0 value at which a frame error occurred in previous processing; and setting a fourth value that is greater than said third value as said downward updating amount when said reference value is greater than said Eb/I0 value of error incidence.

3. A method according to claim 2, wherein said step of setting said upward updating amount in accordance with the logical state of said error incidence flag comprises the steps of:

setting a value that is greater than double said fourth value as said upward updating amount when said error incidence flag is ON;

setting a value that is double said downward updating amount that is currently set as said upward updating amount when said error incidence flag is OFF;

when the Eb/I0 value of said received signals is smaller than said minimum Eb/I0 value of error incidence, setting the Eb/I0 value as a new said minimum Eb/I0 value of error incidence; and setting the Eb/I0 value of said received signals as new said Eb/I0 value of error incidence.

4. A closed-loop transmitting power control method in which a receiver instructs a transmitter to increase or decrease transmitting power such that an Eb/I0 value of signals received by said receiver from said transmitter converges on a set reference value, said method comprising the steps of:

performing a measurement at said receiver of frame errors during a fixed time interval of received signals from said transmitter;

if a frame error is not detected in said measurement, setting a downward updating amount, which is an updating amount for lowering said reference value, in accordance with the magnitude of said reference value, lowering said reference value by said downward updating amount, and further, subtracting "1" from a fluctuation level value, which is a value indicative of the degree of stability of the communication environment, unless said fluctuation level value is "0"; and if a frame error is detected in said measurement, setting an upward updating amount, which is an updating amount for raising said reference value, in accordance with said fluctuation level value, raising said reference value by the upward updating amount, and further, adding "1" to said fluctuation level value.

5. A method according to claim 4 wherein the step of setting said downward updating amount according to the magnitude of said reference value comprises the steps of:

setting a first value as said downward updating amount when said reference value is less than or equal to a minimum Eb/I0 value of error incidence, which is the minimum Eb/I0 value at which frame errors occur;

setting a second value that is greater than said first value as said downward updating amount when said reference value is greater than said minimum Eb/I0 value of error incidence and less than or equal to the sum of said minimum Eb/I0 value of error incidence and an update warning threshold value, which is a predetermined fixed value;

setting a third value that is greater than said second value as said downward updating amount when said reference value is greater than the sum of said minimum Eb/I0 value of error incidence and said update warning threshold value and less than or equal to an Eb/I0 value of error incidence, which is the Eb/I0 value at which a frame error occurred in previous processing; and setting a fourth value that is greater than said third value as said downward updating amount when said reference value is greater than said Eb/I0 value of error incidence.

6. A method according to claim 5, wherein said step of setting said upward updating amount in accordance with said fluctuation level value comprises the steps of:

setting a value that is the result of multiplying said fluctuation level value and a predetermined value together as said upward updating amount when said fluctuation level value is 1 or more;

setting a value that is double said downward updating amount that is currently set as said upward updating amount when said fluctuation level value is "0";

when the Eb/I0 value of said received signals is smaller than said minimum Eb/I0 value of error incidence, setting the Eb/I0 value as a new said minimum Eb/I0 value of error incidence; and setting the Eb/I0 value of said received signals as a new said Eb/I0 value of error incidence.

* * * * *